UNITED STATES PATENT OFFICE.

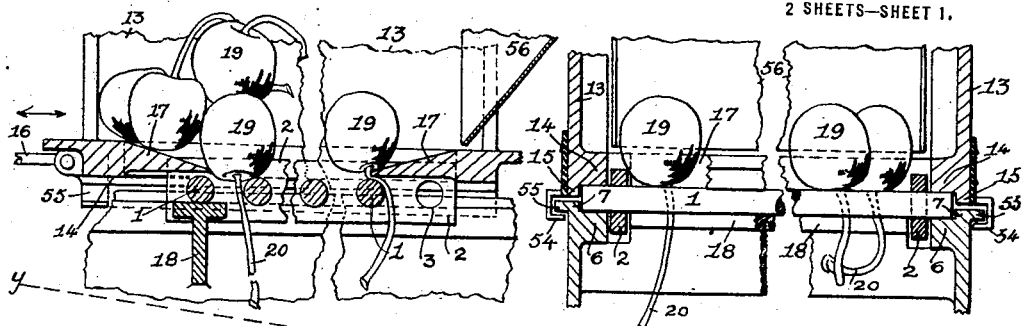
Fig. 1. Fig. 2.
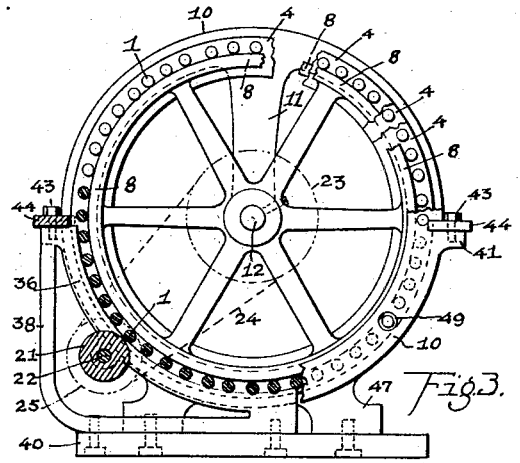
Fig. 3.
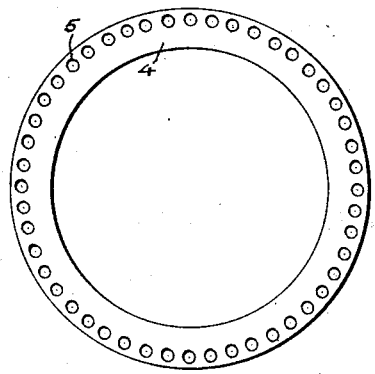
Fig. 4.
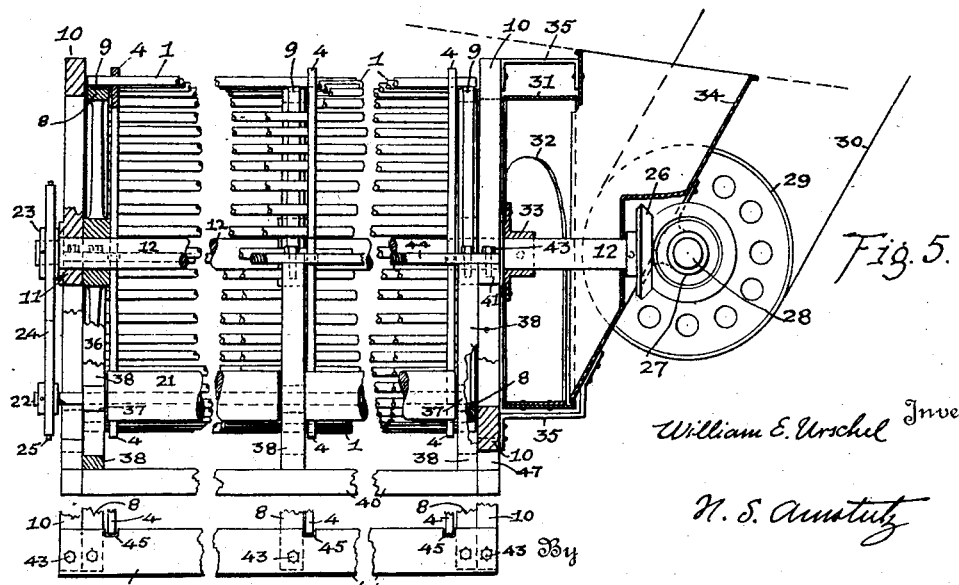
Fig. 5.
Fig. 6.
William E. Urschel, Inventor W. E. URSCHEL.
APPARATUS FOR AND PROCESS OF STEMMING FRUIT.
APPLICATION FILED FEB. 4, 1918.
1,409,802.
Patented Mar. 14, 1922.
2 SHEETS—SHEET 2.
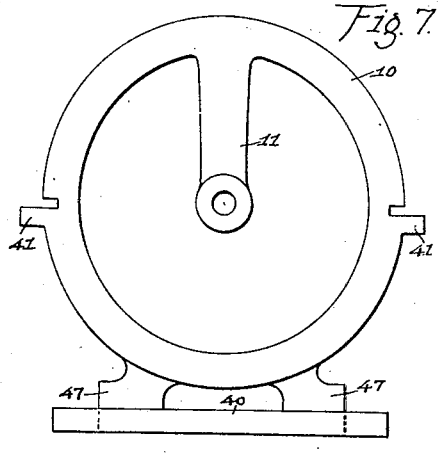
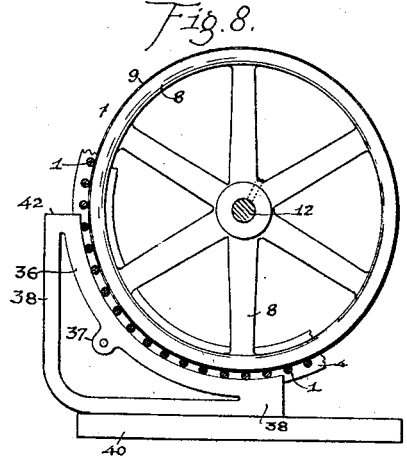
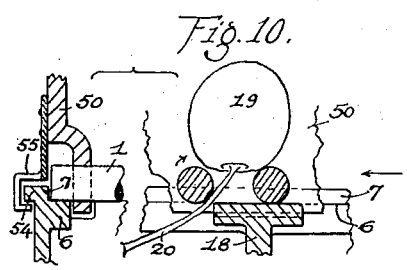
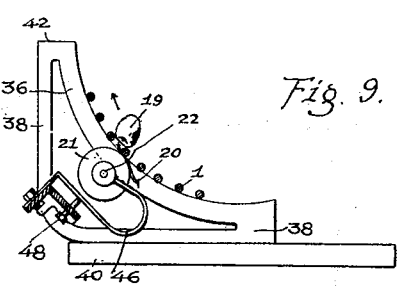
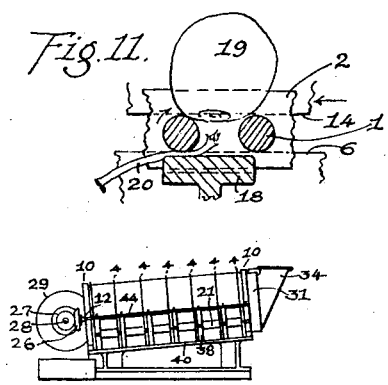
Inventor
William E. Urschel
N. S. Amstutz
By
Attorney

WILLIAM E. URSCHEL, OF VALPARAISO, INDIANA.

APPARATUS FOR AND PROCESS OF STEMMING FRUIT.

1,409,802.     Specification of Letters Patent.     Patented Mar. 14, 1922.

Application filed February 4, 1918. Serial No. 215,321.

*To all whom it may concern:*

Be it known that I, WILLIAM E. URSCHEL, citizen of the United States, residing at Valparaiso, in the county of Porter and State of Indiana, have invented certain new and useful Improvements in Apparatus for and Processes of Stemming Fruit, of which the following is a specification.

My invention relates to apparatus for and process of stemming fruit and it more especially consists of the features pointed out in the annexed claims.

Among different purposes to which my invention may be adapted it is designed to provide an automatic fruit stemmer that continuously shifts the fruit into new positions; that provides openings into which the fruit stems can project; that at the same time individual fruit is caused to change its position a quantity of it is also moved bodily so as to cause the protruding stems to engage a fixed body or detaching member so placed as to present an obstacle to the free passage of the stems and thereby pull them from the fruit; that brings about the automatic separation of any of the well known fruits as cherries, plums, apricots, etc., from their stems without manual manipulation of any kind whatever; and that continuously brings the fruit into new positions so as to multiply the probability of every stem finding an opening while passing through the stemmer.

Fig. 1 is a diagrammatic end elevation in section of a reciprocating stemmer showing a protruding stem between the rollers to show the basic feature of the roller supports, tracks, etc., as equally applicable to reciprocating, rotary or oscillating types of machines.

Fig. 2 is a diagrammatic side elevation in section of Fig. 1.

Fig. 3 is an end elevation of a rotating stemmer.

Fig. 4 is a detached elevation of a ring type of roller holder.

Fig. 5 is a side elevation partly in section of Fig. 3 showing the assembled relation of the different parts.

Fig. 6 is a detached top plan view of one of the main frame tie bars.

Fig. 7 is an elevation of one of the end frames.

Fig. 8 is an elevation of one of the rotating roller tracks and a stationary track segment in assembled relation.

Fig. 9 is an end elevation of an elastic support for the arresting or detaching member.

Figs. 10 and 11 are purely diagrammatic views showing in 10 the stem projecting between rollers and in 11 the stem detached.

Fig. 12 is a plan view of a fixed detaching member in its relation to the rotative tracks, stationary track segments and the roller carriers.

Fig. 13 is a diagrammatic view of a delivery end drive and the assembly of a larger number of roller carriers etc., than are shown in Fig. 5.

Fig. 14 is a diagrammatic end elevation of positively rotated rollers having bearing in a "basket" or ring supports.

In practically carrying out my invention I may use various constructive expedients and alternative means to accomplish the automatic removal of fruit stems without departing from the spirit of the invention.

In its broadest aspect the basic principle consists of any suitable rolling supports 1 on which the fruit rests (Figs. 1, 10 and 11) while it is bodily moved either by reciprocation as suggested in Fig. 1 or by continuous rotation as exemplified in Fig. 3 or by an oscillatory movement of the cylinder type of stemmer. The latter expedient being a substantial equivalent of the horizontal reciprocating form instanced in Figs. 1 and 2.

The rollers 1 are spaced apart and are of such a diameter as the various kinds of fruit may demand and it is to be understood that the proportion of the various parts shown are not to be interpreted as limitations in any sense whatever.

The stems 20 of the fruit 19 will through its changes of position intermittently find an opportunity to project through the space between the rollers and as the rollers and fruit are moved past a detaching member 18 which is relatively fixed the stems are pulled off from the fruit. It is immaterial how the rollers are caused to rotate, whether by frictional means on horizontal tracks 6 and segmental tracks 36 or are positively driven as shown in Fig. 14 by means of a straight or curved rack 52 and pinions 51 on the ends of the rollers. The important thing is to cause the fruit to change position and the protruding stems to move toward a stationary detaching member as 18 or 21 so that they will be caught between such fixed bodies and a moving roller 1. The space between adjacent rollers 1 is too small to permit the fruit 19 to pass hence the stems 20 are forcibly pulled away.

The stems may also be pulled off by utilizing an expedient instanced in Fig. 1 wherein the beveled retaining plates 17 in moving above the rollers 1 will push the cherries 19 off from the stems 20 as shown in the right hand portion of this figure because the rollers 1 will thus form a substitute for fixed detaching members 18 and 21. Even though both the rollers 1 and plates 17 traverse laterally the plates move faster than the rollers and whenever they catch up with each other and any stems happen to be found between them this difference in speed will pull the stem from the fruit. In view of these working equivalents that accomplish the same purpose with substantially the same structural elements though by differing adaptations this invention is unique and is so broad as to cover any form of mechanism, that continuously changes the position of the fruit without injurious handling; that provides open spaces in the carrier into which the stems may project; and by coacting means pulls the stems off.

It is immaterial whether the detaching members remain relatively fixed or that they have lateral movement past the rollers 1 and the rollers be fixed in position but caused to rotate by any desired expedient so as to delicately shift the fruit into new positions. Any protruding stems will be equally removed by either expedient.

In Fig. 1 substantially the same means are used as shown in Fig. 3. These comprise rollers 1 having bearing in openings 3 of plate 2. The ends of the rollers rest on tracks 6 between ledges 7 shown in Fig. 2. Plates 2 are placed just inside of the tracks. A notch is formed in the detaching bar 18 to accommodate the plates 2 which are loose on the rollers. Above the tracks 6 a "basket" 13 with its tracks 14 rests on the ends of the rollers. A ledge 15 depends outside of the roller ends and prevents lateral displacement of the basket. Rod 16 or its equivalent may be used to reciprocate the basket. Beveled plates 17 also serve to prevent fruit falling through between the last roller and the basket walls when the basket is at the extremes of its travel. In this exemplification there is a difference in the rate of travel between the basket and the group of rollers, the former moving fastest.

In Figs. 3 and 5 a similar difference in speed between the wheel tracks 8 and the ring roller supports 4 exists. As the shaft 12 is rotated in bearings 11 of the end frames 10 the wheel tracks 8 are carried around with it. These may have rubber treads 9 against which rollers 1 bear. All the rollers are placed loosely into openings 5 of the ring supports 4. The purpose of these rings is to keep the rollers properly spaced and prevent their twisting with respect to the shaft 12. An opening 49, Fig. 3, in one of the end frames permits any of the rollers being removed and another inserted, as needed without dismantling the apparatus. To cause the rollers 1 to rotate by friction segmental treads 36 are provided, as shown in Figs. 3 and 8. One of these is placed opposite each wheel track 8 as shown in Fig. 12.

This relation of parts brings about the same kind of movement as in Figs. 1, 2 and 11. The parts 8 being equivalents of basket 13, rings 4 of plates 2 and treads 36 of those marked 6 in the reciprocating device. A counter part of the detaching bar 18 is found in the roller 21. This may be rotated if desired by a chain 24 that engages a sprocket wheel 25 on the roller shaft 22 and a sprocket wheel 23 on the drive shaft 12. If the roller 21 is not to rotate it may be held by set screw 39, Fig. 12. As a matter of fact there are separate rollers 21 between adjacent pairs of rings 4, their shaft 22 having bearing in ears 37 of the tread frames 38.

In case these rollers are to be elastically supported so as to overcome excessive precision in manufacture and override obstacles they may be supported on springs 46 subject to adjustment by means of set screws 48 shown in Fig. 9. The rings 4 and wheel tracks 8 are assembled in whatever number may be required according to the capacity desired. The fruit is caused to travel through the stemmer by setting it at an inclination as shown in Fig. 13. In Fig. 5 the distance between rings 4 is indefinite as this may be largely varied.

In contrast to the means instanced in Figs. 1 and 3 for rotating rollers 1 they may also be rotated as in Fig. 10 by having bearing in sides 50 of the basket. As the basket is moved to and fro the rollers will roll on tracks 6 and the basket will act as a "cage" instead of the plates 2 or the rings 4. The basket is held in place by any desired form of hooks 55 passing under ledges 54 as also shown in Fig. 2.

Another expedient may be employed if the roller 1 are to be rotated positively. This is instanced in Fig. 14. Each roller may have pinions 51 attached to each end. These mesh with racks 52 that may be straight for reciprocating manipulation or curved when they are to take the place of treads 36 for continuous rotative or occilatory movement of a cylinder type of machine. If the racks 52 are also to form a slide for a "basket" then a ledge 53 would form such a support instead of tracks 6.

All the frames 10 and tread frames 38 are supported on a base 40. Tie bars 44 are secured on lugs 41 of the end frames and they are also fastened to the frames 38 at seats 42 by screws 43. The frames 10 have feet 47 by which they are secured to the base 40 and the tie bars 44 have slots 45 into which the outer edges of rings 4 project so as to hold them properly spaced with respect to each other.

The drum or cylinder type of machine shown in Figs. 3 and 5 may be driven from either end as shown in Figs. 5 and 13. The shaft 12 has a bevel or mitre gear 26 that meshes with a companion 27 on drive shaft 28. A pulley 29 on this shaft is driven by belt 30. The machine is set on an incline as shown in Fig. 13. The fruit is fed into hopper 34 supported by brackets 35.

Between the hopper 34 and the end frame a rotating feeding casing 31 is placed. It has openings leading into the cylinder and a scoop 32 for lifting the fruit into the cylinder. This feed casing is attached to the shaft 12 by means of a collar 33 so that as it rotates with the shaft the fruit is periodically raised from the bottom of the hopper to prevent clogging and also to insure a steady supply of fruit to the cylinder.

In practically using any of the reciprocating expedients herein disclosed or their equivalents the "baskets" which hold the fruit and the rollers, in effect constituting its bottom, with the related tracks etc., would stand at an incline similar to Fig. 13 or as shown by the dotted line $yy$ in Fig. 1. A hopper 56 shown in this figure similar to 34 shown in Fig. 5 is placed at the upper end of the incline. The fruit will drop by gravity and will travel across the transversely placed rollers 1 through the impulses imparted by reciprocating the basket. In this basket type the rollers are transverse of the direction of fruit travel. In the rotary type the rollers are disposed parallel to the path of the fruit travel as in the case of an oscillatory movement applied to the machine instanced in Fig. 3. In such an adaptation, to increase the capacity more than one set of rollers 21 would be used and in the reciprocating type more than one bar 18 may be used.

What I claim is,

1. In fruit stemmers a series of supports spaced apart, means for supporting the fruit on one side of said supports to only permit the fruit stems to protrude between them, suitable detaching means on the other side of the supports, means for producing movement between the detaching means and the supports to thereby pull the stems away from the fruit, and means for independently imparting motion to the supports to cause the fruit to change its position thereon.

2. The process of stemming fruit consisting in subjecting the fruit to agitation on a discontinuous surface provided with individually movable elements to thereby variably position the fruit and to cause the stems of the fruit to be intermittently projected through said surface in the same general direction while the fruit is so positioned and in causing the projecting stems to be pulled away from the fruit.

3. The process of stemming fruit consisting in subjecting the fruit to agitation on a discontinuous surface provided with individually movable elements so as to cause it to approximate parallel groups and to cause the stems of the fruit to intermittently project through said surface in the same general direction, in causing the stems to be held independently of the agitated fruit and in causing movement between the fruit and stems to pull the one from the other.

4. In fruit stemmers, a plurality of roller supports grouped to constitute a carrier, means for imparting movement to the group, means for rotating the rollers independently of each other and of the movement of the group, the rollers being spaced to allow the stems of cherries to project between them, and means located adjacent the path of group travel of the rollers to automatically separate the fruit and stems from each other.

5. In fruit stemmers, a plurality of rollers spaced apart to form a movable support having openings between the rollers through which the fruit stems can project, stationary means opposite the supporting side of the rollers for pressing the fruit stems against the rollers to detach the stems, and means for imparting a variable rate of movement to the supporting and detaching surfaces of the rollers with respect to the fruit and the detaching means whereby the stems are separated from the fruit rapidly and without serious damage to the fruit.

6. In fruit stemmers, a plurality of separately rotatable supports spaced apart adapted to hold fruit thereon and permit the stems to pass between the supports, detaching means placed adjacent the supports, and means for producing movement between the supports and said detaching means whereby the stems will be pulled away from the fruit.

7. In fruit stemmers, a plurality of rolling supports adapted to hold fruit thereon said supports being spaced apart in accordance with the kind of fruit to be stemmed so as to only permit the stems to pass between them and the thickness of the supports being approximately less than the shortest type of stems that are to be removed.

8. In fruit stemmers, roller supports spaced apart from each other adapted to hold fruit thereon and permit the stems to project into the space between the supports at will, means for intermittently changing the position of the fruit on the supports so as to cause the stems to have repeated opportunities to pass between the supports, and means located adjacent the supports adapted to detach the stems from the fruit.

9. In fruit stemmers, a series of roller supports constituting a component part of a fruit holder, means for imparting movement to the holder, means adapted to separately rotate the rollers through movement of the holder, retaining means adapted to keep the fruit in the holder during treatment so as to rest on the rollers, and means for pressing the stems against the other side of the rollers in opposition to the movement of the holder so as to thereby separate the stems from the fruit.

10. In fruit stemmers, a series of roller supports spaced apart to form openings between them, means for imparting rotary movement to the rollers, means for retaining fruit on the rollers, means for engaging the fruit stems as they project through between the rollers, means for imparting bodily movement to the fruit, and means for causing the roller surfaces next to the fruit to move in a direction opposite to the roller surfaces which detach the stems.

11. In a stemming apparatus including a rotatably mounted fruit receiving drum for receiving and supporting the fruit during the stemming thereof, the wall of said drum being formed of individually movable elements to provide a spaced plurality of openings through which the stems to be removed are adapted to project on the rotation of said drum, movable stem engaging removing means positioned at the outer side of said opening for engaging and removing the stems as projected therethrough from the fruit, means for positively operating said stem engaging and removing means during the rotation of said drum and means for rotating said drum.

12. A stemming device, comprising a movable container actuated in a certain definite direction and including rollable means so positioned thereon that the fruit to be stemmed is carried in advance of said means with the stems intermittently projecting on that side of the rollable means which is opposite to the fruit itself as it rests against such means, and suitable detaching means placed adjacent the path of travel of the rollable means but external of the container and adapted to press the stems against such latter means and stop the movement of the stems to thereby pull them from the fruit.

In testimony whereof I affix my signature.

WILLIAM E. URSCHEL.